(12) United States Patent
Cherif et al.

(10) Patent No.: US 12,237,980 B2
(45) Date of Patent: *Feb. 25, 2025

(54) TOPOLOGY SYNTHESIS OF A NETWORK-ON-CHIP (NoC)

(71) Applicant: ARTERIS, INC., Campbell, CA (US)

(72) Inventors: Moez Cherif, San Jose, CA (US); Benoit De Lescure, Campbell, CA (US); Xavier Van Ruymbeke, Montigny-le-Bretonneux (FR)

(73) Assignee: ARTERIS, INC., Campbell, CA (US)

( * ) Notice: Subject to any disclaimer, the term of this patent is extended or adjusted under 35 U.S.C. 154(b) by 712 days.

This patent is subject to a terminal disclaimer.

(21) Appl. No.: 17/471,857

(22) Filed: Sep. 10, 2021

(65) Prior Publication Data

US 2021/0409284 A1 Dec. 30, 2021

Related U.S. Application Data

(63) Continuation of application No. 16/728,335, filed on Dec. 27, 2019, now Pat. No. 11,121,933.

(51) Int. Cl.
*H04L 41/14* (2022.01)
*G06F 30/32* (2020.01)
(Continued)

(52) U.S. Cl.
CPC ............ *H04L 41/145* (2013.01); *G06F 30/32* (2020.01); *G06F 30/392* (2020.01);
(Continued)

(58) Field of Classification Search
CPC ... H04L 41/145; H04L 41/0803; H04L 41/12; H04L 43/0811; H04L 41/0823;
(Continued)

(56) References Cited

U.S. PATENT DOCUMENTS 5,485,396 A 1/1996 Brasen et al.
5,541,849 A 7/1996 Rostoker et al.
(Continued)

FOREIGN PATENT DOCUMENTS

CN 105187313 B 5/2018
CN 109587081 A 4/2019
(Continued)

OTHER PUBLICATIONS

James C. Tiernan. 1970. An efficient search algorithm to find the elementary circuits of a graph. Commun. ACM 13, 12 (Dec. 1970), 722-726. https://doi.org/10.1145/362814.362819.
(Continued)

*Primary Examiner* — Stacy Whitmore
(74) *Attorney, Agent, or Firm* — Jubin Dana; Dana Legal Services

(57) ABSTRACT

Systems and methods are disclosed for synthesis of a network, such as a network-on-chip (NoC), to generate a network description. The system generates a NoC description from a set of physical constraints and performance constraints as well as a set of inputs to a sequencer. The system produces the NoC with all its elements. The resulting network description output includes placement of elements on a floorplan of a chip that represents the network, such as the NoC.

15 Claims, 13 Drawing Sheets

(51) Int. Cl.
*G06F 30/392* (2020.01)
*G06F 30/394* (2020.01)
*H04L 41/0803* (2022.01)
*H04L 41/12* (2022.01)
*H04L 43/0811* (2022.01)
*H04L 45/00* (2022.01)
*H04L 67/1001* (2022.01)
*H04L 69/329* (2022.01)
*H04W 40/32* (2009.01)
*H04W 84/18* (2009.01)
*G06F 115/02* (2020.01)

(52) U.S. Cl.
CPC ........ *G06F 30/394* (2020.01); *H04L 41/0803* (2013.01); *H04L 41/12* (2013.01); *H04L 43/0811* (2013.01); *H04L 45/46* (2013.01); *H04L 67/1001* (2022.05); *H04L 69/329* (2013.01); *H04W 40/32* (2013.01); *H04W 84/18* (2013.01); *G06F 2115/02* (2020.01)

(58) Field of Classification Search
CPC ...... G06F 30/32; G06F 30/392; G06F 30/394; G06F 2115/02; G06F 30/39; G06F 15/17; G06F 15/7807
See application file for complete search history.

(56) References Cited

U.S. PATENT DOCUMENTS

| | | | |
|---|---|---|---|
| 5,623,420 A | 4/1997 | Yee et al. | |
| 5,638,288 A | 6/1997 | Deeley | |
| 5,761,078 A | 6/1998 | Fuller et al. | |
| 5,887,670 A | 3/1999 | Tabata et al. | |
| 5,903,886 A | 5/1999 | Heimlich et al. | |
| 5,983,277 A | 11/1999 | Heile et al. | |
| 6,002,857 A | 12/1999 | Ramachandran | |
| 6,134,705 A | 10/2000 | Pedersen et al. | |
| 6,145,117 A | 11/2000 | Eng | |
| 6,249,902 B1 | 6/2001 | Igusa et al. | |
| 6,321,363 B1 | 11/2001 | Huang et al. | |
| 6,360,356 B1 | 3/2002 | Eng | |
| 6,378,121 B2 | 4/2002 | Hiraga | |
| 6,421,321 B1 | 7/2002 | Sakagawa et al. | |
| 6,437,804 B1 | 8/2002 | Ibe et al. | |
| 6,449,761 B1 | 9/2002 | Greidinger et al. | |
| 6,622,225 B1 | 9/2003 | Kessler et al. | |
| 6,883,455 B2 | 4/2005 | Maeda et al. | |
| 6,907,591 B1 | 6/2005 | Teig et al. | |
| 7,096,436 B2 | 8/2006 | Bednar et al. | |
| 7,398,497 B2 | 7/2008 | Sato et al. | |
| 7,587,687 B2 | 9/2009 | Watanabe et al. | |
| 7,788,625 B1 | 8/2010 | Donlin et al. | |
| 8,042,087 B2* | 10/2011 | Murali | G06F 30/30 370/293 |
| 8,302,041 B1 | 10/2012 | Chan et al. | |
| 8,819,611 B2 | 8/2014 | Philip et al. | |
| 9,184,998 B2 | 11/2015 | Xue | |
| 9,262,359 B1 | 2/2016 | Noice et al. | |
| 9,444,702 B1 | 9/2016 | Raponi et al. | |
| 9,569,574 B1 | 2/2017 | Khan et al. | |
| 9,792,397 B1 | 10/2017 | Nagaraja | |
| 9,825,779 B2 | 11/2017 | Ruymbeke et al. | |
| 9,940,423 B2* | 4/2018 | de Lescure | G06F 30/392 |
| 10,068,047 B1 | 9/2018 | Finn | |
| 10,282,502 B1 | 5/2019 | BShara et al. | |
| 10,348,563 B2 | 7/2019 | Rao et al. | |
| 10,460,062 B2 | 10/2019 | Feld et al. | |
| 10,733,350 B1 | 8/2020 | Prasad et al. | |
| 10,853,545 B1 | 12/2020 | Nardi et al. | |
| 10,922,471 B2 | 2/2021 | Baeckler et al. | |
| 10,990,724 B1* | 4/2021 | Cherif | G06F 30/394 |
| 11,121,933 B2* | 9/2021 | Cherif | H04L 41/145 |
| 11,281,827 B1 | 3/2022 | Labib et al. | |
| 11,449,655 B2 | 9/2022 | Cherif et al. | |
| 11,601,357 B2* | 3/2023 | Cherif | H04L 45/42 |
| 11,657,203 B2* | 5/2023 | Cherif | G06F 15/7825 716/132 |
| 11,665,776 B2* | 5/2023 | Cherif | H04L 67/1001 716/132 |
| 2003/0093765 A1 | 5/2003 | Lam et al. | |
| 2004/0040007 A1 | 2/2004 | Harn | |
| 2004/0230919 A1 | 11/2004 | Balasubramanian et al. | |
| 2005/0073316 A1 | 4/2005 | Graham | |
| 2005/0268258 A1 | 12/2005 | Decker | |
| 2007/0156378 A1 | 7/2007 | McNamara | |
| 2007/0157131 A1 | 7/2007 | Watanabe et al. | |
| 2007/0174795 A1 | 7/2007 | Lavagno et al. | |
| 2007/0186018 A1 | 8/2007 | Radulescu et al. | |
| 2008/0046854 A1 | 2/2008 | Tang | |
| 2008/0049753 A1 | 2/2008 | Heinze et al. | |
| 2008/0279183 A1 | 11/2008 | Wiley et al. | |
| 2008/0291826 A1 | 11/2008 | Licardie et al. | |
| 2009/0031277 A1 | 1/2009 | Mcelvain et al. | |
| 2009/0313592 A1 | 12/2009 | Murali et al. | |
| 2010/0061352 A1 | 3/2010 | Fasolo et al. | |
| 2010/0162189 A1 | 6/2010 | Lavagno et al. | |
| 2010/0218146 A1 | 8/2010 | Platzker et al. | |
| 2010/0274785 A1 | 10/2010 | Procopiuc et al. | |
| 2011/0170406 A1 | 7/2011 | Krishnaswamy | |
| 2012/0013509 A1 | 1/2012 | Wisherd et al. | |
| 2012/0311512 A1 | 12/2012 | Michel et al. | |
| 2013/0174113 A1 | 7/2013 | Lecler et al. | |
| 2013/0208598 A1 | 8/2013 | Nakaya et al. | |
| 2013/0258847 A1 | 10/2013 | Zhang et al. | |
| 2013/0283226 A1 | 10/2013 | Ho et al. | |
| 2014/0115218 A1 | 4/2014 | Philip et al. | |
| 2014/0126572 A1 | 5/2014 | Hutton et al. | |
| 2014/0153575 A1 | 6/2014 | Munoz | |
| 2014/0156826 A1 | 6/2014 | Chang et al. | |
| 2014/0160939 A1 | 6/2014 | Arad et al. | |
| 2014/0169173 A1 | 6/2014 | Naouri et al. | |
| 2014/0204735 A1 | 7/2014 | Kumar et al. | |
| 2014/0211622 A1 | 7/2014 | Kumar et al. | |
| 2014/0298281 A1 | 10/2014 | Varadarajan et al. | |
| 2014/0321839 A1 | 10/2014 | Armstrong | |
| 2015/0036536 A1 | 2/2015 | Kumar et al. | |
| 2015/0106778 A1 | 4/2015 | Mangano et al. | |
| 2015/0121319 A1 | 4/2015 | Hutton et al. | |
| 2015/0178435 A1 | 6/2015 | Kumar | |
| 2015/0254325 A1 | 9/2015 | Stringham | |
| 2015/0341224 A1 | 11/2015 | Van et al. | |
| 2015/0347641 A1 | 12/2015 | Gristede et al. | |
| 2016/0103943 A1 | 4/2016 | Xia et al. | |
| 2016/0275213 A1 | 9/2016 | Tomita | |
| 2016/0321390 A1 | 11/2016 | Bozman et al. | |
| 2017/0060204 A1 | 3/2017 | Gangwar et al. | |
| 2017/0063734 A1 | 3/2017 | Kumar | |
| 2017/0132350 A1 | 5/2017 | Janac | |
| 2017/0177778 A1 | 6/2017 | Lescure | |
| 2017/0193136 A1 | 7/2017 | Prasad et al. | |
| 2017/0230253 A1* | 8/2017 | Chopra | H04L 41/145 |
| 2018/0115487 A1 | 4/2018 | Thubert et al. | |
| 2018/0144071 A1 | 5/2018 | Yu et al. | |
| 2018/0227180 A1 | 8/2018 | Rao et al. | |
| 2019/0012909 A1 | 1/2019 | Mintz | |
| 2019/0073440 A1 | 3/2019 | Farbiz et al. | |
| 2019/0205493 A1 | 7/2019 | Garibay et al. | |
| 2019/0246989 A1 | 8/2019 | Genov et al. | |
| 2019/0251227 A1 | 8/2019 | Fink | |
| 2019/0260504 A1 | 8/2019 | Philip et al. | |
| 2019/0363789 A1 | 11/2019 | Lee et al. | |
| 2020/0092230 A1 | 3/2020 | Schultz et al. | |
| 2020/0162335 A1 | 5/2020 | Chen et al. | |
| 2020/0234582 A1 | 7/2020 | Mintz | |
| 2020/0366607 A1 | 11/2020 | Kommula et al. | |
| 2021/0203557 A1 | 7/2021 | Cherif et al. | |
| 2021/0226887 A1 | 7/2021 | Mereddy | |
| 2021/0320869 A1 | 10/2021 | Bourai et al. | |

(56) References Cited

U.S. PATENT DOCUMENTS

| | | | |
|---|---|---|---|
| 2021/0409284 | A1 | 12/2021 | Cherif et al. |
| 2022/0294704 | A1 | 9/2022 | Lescure et al. |

FOREIGN PATENT DOCUMENTS

| | | | |
|---|---|---|---|
| CN | 113051215 | A | 6/2021 |
| CN | 113055219 | A | 6/2021 |
| DE | 102015014851 | A1 | 5/2016 |
| EP | 3842987 | A1 | 6/2021 |
| EP | 4024262 | A1 | 7/2022 |
| EP | 4057179 | A1 | 9/2022 |

OTHER PUBLICATIONS

Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].

U.S. Appl. No. 17/134,384, filed Dec. 26, 2020, Federico Angiolini.

U.S. Appl. No. 17/665,578, Feb. 6, 2022, K. Charles Janac.

"A distributed interleaving scheme for efficient access to wideIO dram memory", Seiculescu Ciprian, Benini Luca, De Micheli Giovanni, CODES+ISSS'12 (Year: 2012).

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conterence Alberto Ghiribaldi, Herve Tatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.

ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.

Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.

K. R. Manik et al., "Methodology for Design of Optimum NOC Based on I PG," 2017 Int'l Conference on Algorithms, Methodology, Model and Applications in Emerging Technologies (ICAMMAET), Chennai, India, IEEE, 6 pages. (Year: 2017).

Luca Benini: "Application specific Noc design", Design, Automation and Test in Europe, 2006, DATE '06 Mar. 6-10, 2006, [Munich, Germany; Proceedings] / [Sponsored By the European Design and Automation Association], IEEE, Piscataway, NJ, USA, Mar. 6, 2006 (Mar. 6, 2006), pp. 491-495, XP058393584, ISBN: 9783981080100.

Anonymous: "Network on a chip—Wikipedia", Jun. 15, 2021, https://en.wikipedia.org/w/index.php?title=Network_on_a_chip&oldid=1028654828.

Haytham Elmiligi et al: "Networks-on-chip topology optimization subject to power, delay, and reliability constraints", IEEE International Symposium on Circuits and Systems, May 30, 2010, pp. 2354-2357 DOI: 10.1109/ISCAS.2010.5537194.

Jain R. et al: "Predicting system-level area and delay for pipelined and nonpipelined designs", IEEE Transactions on Computer Aided Design of Integrated Circuits and Systems, vol. 11, No. 8, Jan. 1, 1992, pp. 955-965, DOI: 10. 1109/43.149767.

Jingye Xu et al: "Latch Based Interconnect Pipelining For High Speed Integrated Circuits", Proceedings of the International Conference on Electro/Information Technology, May 1, 2006, pp. 295-300 DOI: 10.1109/EIT.2006.252152.

Jun Minje et al: "Exploiting Implementation Diversity and Partial Connection of Routers in Application-Specific Network-on-Chip Topology Synthesis", IEEE Transactions on Computers, IEEE, USA, vol. 63, No. 6, Jun. 1, 2014 (Jun. 1, 2014), pp. 1434-1445, XP011550397, ISSN: 0018-9340, DOI: 10.1109/TC.2012.294.

Saponara S et al: "Design and coverage-driven verification of a novel network-interface IP macrocell for network-on-chip interconnects", Microprocessors and Microsystems, vol. 35, No. 6 , pp. 579-592, XP028255708, ISSN: 0141-9331, DOI: 10.1016/J.MICPRO, 2011.06.005.

Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150, XP029678799, ISSN: 0141-9331, DOI: 10.1016/J.MICPR0. 2016.04.008.

Song Z et al: "A NoC-Based High Performance Deadlock Avoidance Routing Algorithm", Computer and Computational Sciences, 2008. IMSCCS '08. International Multisymposiums On, IEEE Piscataway, NJ, USA, Oct. 18, 2008, pp. 140-143, XP031411025, ISBN: 978-0-7695-3430-5.

Anonymous: "Intel Hyperflex Architecture HighPerformance Design Handbook", Oct. 4, 2021 (Oct. 4, 2021), pp. 1-147, XP093063924, Retrieved from the Internet: URL:https://cdrdv2.intel.com/vl/dl/getContent/667078?fileName=sI0_hp_hb-683353-667078.pdf.

Ken Eguro et al: "Simultaneous Retiming and Placement for Pipelined Net lists", Proceedings of the 16th International Symposium on Field-Programmable Custom Computing Machines, Apr. 14, 2008 (Apr. 14, 2008), pp. 139-148, XP031379339.

Chaari Moomen Moomen Chaari@Infineon Com et al: "A model-based and simulation-assisted FMEDA approach for safety-relevant E/E systems", Proceedings of the 34th ACM SIGMOD-SIGACT-SIGAI Symposium on Principles of Database Systems, ACMPUB27, New York, NY, USA, Jun. 7, 2015 (Jun. 7, 2015), pp. 1-6, XP058511366, DOI: 10.1145/2744769.2747908 ISBN: 978-1-4503-3550-8.

Mariani R et al: "Fault-Robust Microcontrollers for Automotive Applications", On-Line Testing Symposium, 2006. IOLTS 2006. 12th IEEE International Como, Italy Jul. 10-12, 2006, Piscataway, NJ, USA, IEEE, Jul. 10, 2006 (Jul. 10, 2006), pp. 213-218, XP010928275, DOI: 10.1109/IOLTS.2006.38 ISBN: 978-0-7695-2620-I.

Alessandro Pinto et al: "System level design paradigms", ACM Transactions on Design Automation of Electronic Systems, ACM, New York, NY, US, vol. 11, No. 3, Jun. 7, 2004 (Jun. 7, 2004), pp. 537-563, XP058222500.

Bo Huang et al: "Application-Specific Network-on-Chip synthesis with topology-aware floorplanning", Integrated Circuits and Systems Design (SBCCI), 2012 25th Symposium On, IEEE, Aug. 30, 2012 (Aug. 30, 2012), pp. 1-6, XP032471227.

Jean-Jacques Lecler et al: Application driven network-on-chip architecture exploration& refinement for a complex SoC, Design Automation for Embedded Systems, vol. 15 No. 2, Apr. 7, 2011, DOI: 10.1007/S10617-011-9075-5.

Partha et al., Design, Synthesis, and Test of Networks on Chips, IEEE (Year: 2005).

Srinivasan K. et al: "Linear programming based techniques for synthesis of network-on-chip architectures", Computer Design: VLSI in Computers and Processors, 2004. ICCD 2004. Proceedings. IEEE International Conference on San Jose, CA, USA Oct. 11-13, 2004, Piscataway, NJ, USA, IEEE. Oct. 11, 2004 (Oct. 11, 2004), pp. 422-429, XP010736641.

Srinivasan Mural et al: "Mapping and physical planning of networks-on-chip architectures with quality-of-service guarantees", Proceedings of The 2005 Asia and South Pacific Design Automation Conference, Jan. 18, 2005, DOI: 10.1145/1120725.1120737.

Tobias Bjerregaard et al: "A Router Architecture for Connection-Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.

Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.

Zhou Rongrong et al: A Network Components Insertion Method for 3D Application-Specific Network-on-Chip, Proceedings of the 11th

(56) References Cited

OTHER PUBLICATIONS

IEEE International Conference on ASIC, Nov. 3, 2015, pp. 1-4, DOI: 10.1109/ASICON.2015.7516952.
David Atienza et al., Network-on-Chip Design and Synthesis Outlook, Science Direct, Integration the VLSI, journal 41 (2008) 340-359.
Dumitriu Vet al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.
Fangfa Fu et al: "A Noc performance evaluation platform supporting designs at multiple levels of abstraction", Industrial Electronics and Applications, 2009. ICIEA 2009. 4th IEEE Conference On, IEEE, Piscataway, NJ, USA, May 25, 2009 (May 25, 2009), pp. 425-429, XP031482069, ISBN: 978-1-4244-2799-4 *abstract* * p. 426-p. 429 *.
Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007), pp. 869-880, XP011187732, ISSN: 1063-8210, DOI: 10.1109/TVLSI.2007.900742.
Picornell Tomas Tompic@Gap.Upv.Es et al: "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.

* cited by examiner

- 3 master NIUs
- 5 target NIUs
- 3 traffic class labels:
  - BE
  - LL
  - BW
- Hence 3 main switches
- Connectivity + labels:

TOPOLOGY SYNTHESIS OF A NETWORK-ON-CHIP (NoC)

CROSS REFERENCE TO RELATED APPLICATIONS

This application is a continuation of U.S. Pat. No. 11,121,933 (U.S. application Ser. No. 16/728,335 filed on Dec. 27, 2019) entitled PHYSICALLY AWARE TOPOLOGY SYNTHESIS OF A NETWORK and issued on Sep. 14, 2021, the entire disclosure of which is incorporated herein by reference.

FIELD OF THE INVENTION

The present technology is in the field of system design and, more specifically, related to topology synthesis to generate a network-on-chip (NoC) description.

BACKGROUND

Multiprocessor systems have been implemented in systems-on-chips (SoCs) that communicate through network-on-chips (NoCs). The SoCs include instances of master (initiators) intellectual properties (IPs) and slave (targets) IPs. Transactions, in the form of packets, are sent from a master to one or more slaves using industry-standard protocols. The master, connected to the NoC, sends a request transaction to a slave, using an address to select the slave. The NoC decodes the address and transports the request from the master to the slave. The slave handles the transaction and sends a response transaction, which is transported back by the NoC to the master.

For a given set of performance requirements, such as connectivity and latency between source and destination, frequency of the various elements, maximum area available for the NoC logic, minimum throughput between sources and destinations, position on the floorplan of elements attached to the NoC, it is a complex task to create an optimal NoC that fulfills all the requirements with a minimum amount of logic and wires. This is typically the job of the chip architect or chip designer to create this optimal NoC, and this is a difficult and time-consuming task. In addition to this being a difficult task, the design of the NoC is revised every time one of the requirement changes, such as modifications of the chip floorplan or modification of the expected performance. As a result, this task needs to be redone frequently over the design time of the chip. This process is time consuming, which results in production delays. Therefore, what is needed is system and method to efficiently generate a NoC from a set of constraints, which are listed as requirements, and a set of inputs. The system needs to produce the NoC with all its elements placed on a floorplan of a chip.

SUMMARY OF THE INVENTION

In accordance with various embodiments and aspects of the invention, systems and methods are disclosed that generate a network-on-chip (NoC) using a set of constraints and a set of step with inputs to produce or generate the NoC with all its elements. The elements of the NoC are placed on a floorplan of a chip. The advantage of the invention is simplification of design process and the work of the chip architect or designer.

DETAILED DESCRIPTION

Figure 1A:
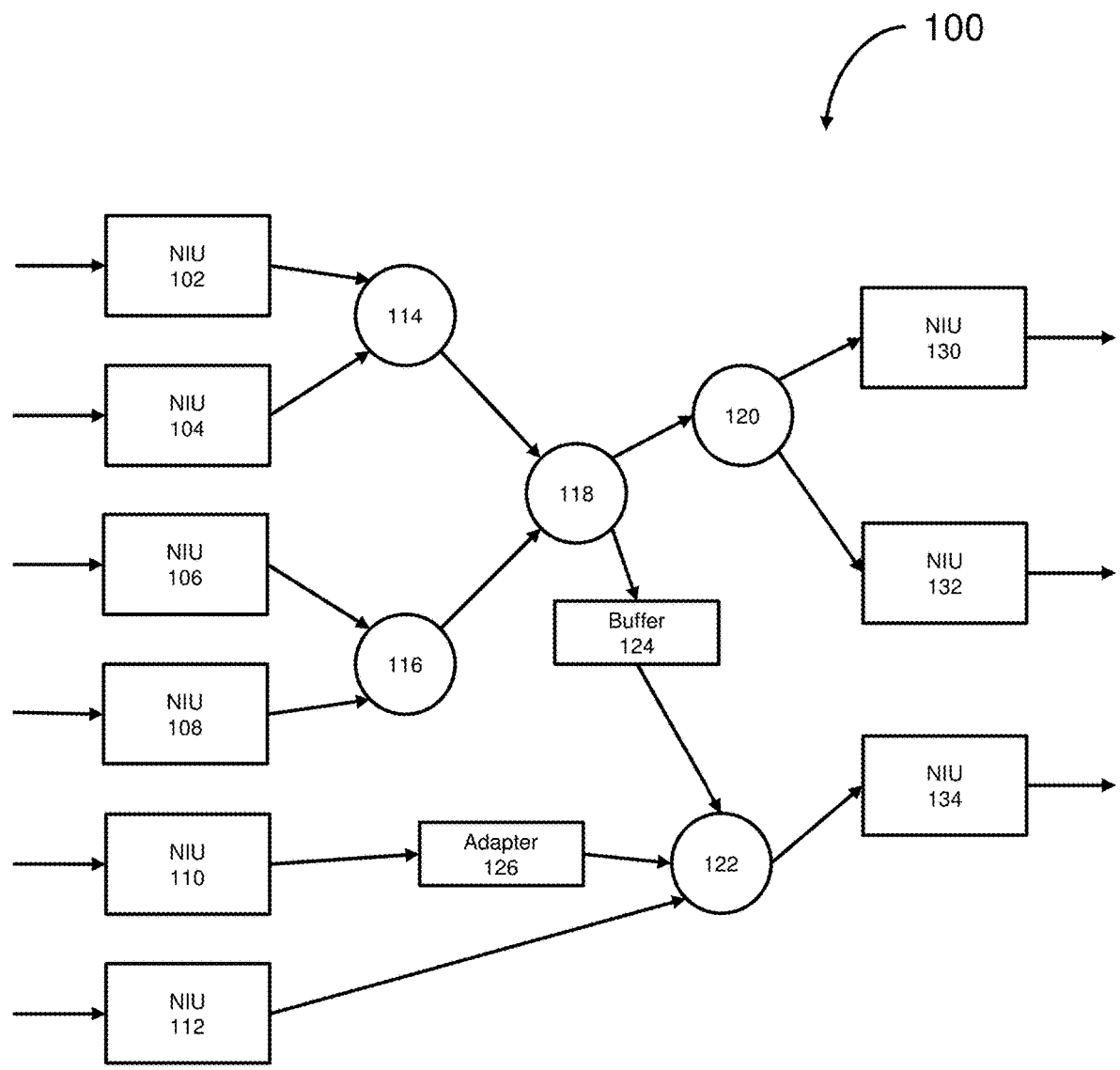
FIG. 1A shows a logic view of a network-on-chip (NoC) that includes various elements that create the NoC.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future.

As used herein, a "master" and a "initiator" refer to similar intellectual property (IP) modules or units and the terms are used interchangeably within the scope and embodiments of the invention. As used herein, a "slave" and a "target" refer to similar IP modules or units and the terms are used interchangeably within the scope and embodiments of the invention. As used herein, a transaction may be a request transaction or a response transaction. Examples of request transactions include write request and read request.

As used herein, a node is defined as a distribution point or a communication endpoint that is capable of creating, receiving, and/or transmitting information over a communication path or channel. A node may refer to any one of the following: switches, splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

Referring now to FIG. 1A, a network-on-chip (NoC) 100 is shown in accordance with various aspects and embodiments of the invention. The NoC 100 is one example of a network. In accordance with various aspects and embodiments of the invention, a network includes a set of nodes and set of edges, each of these has a model and can be used at the heart of the synthesis to perform and implement transformation over the network and converge to the best solution fitting the specified requirements. The NoC 100 includes nodes and endpoints and uses elementary network functions that are assembled, such as: network interface units (NIUs) 102,104,106,108, 110, 112, 130, 132, and 134, nodes/switches 114, 116, 118,120, and 122; adapters, such as adapter 126; and buffers, such as buffer 124. The NoC elementary network functions use an internal transport protocol, which is specific to the NoC 100, to communicate with each other, typically based on the transmission of packets. The NIUs convert the protocol used by the attached system-on-chip (SoC) unit (not shown), into the transport protocol used inside the NoC 100. The switches route flows of traffic between source and destinations. The buffer 124 is used to insert pipelining elements to span long distances, or to store packets to deal with rate adaptation between fast senders and slow receivers or vice-versa. The adapter 126 handles various conversions between data width, clock and power domains.

Figure 1B:
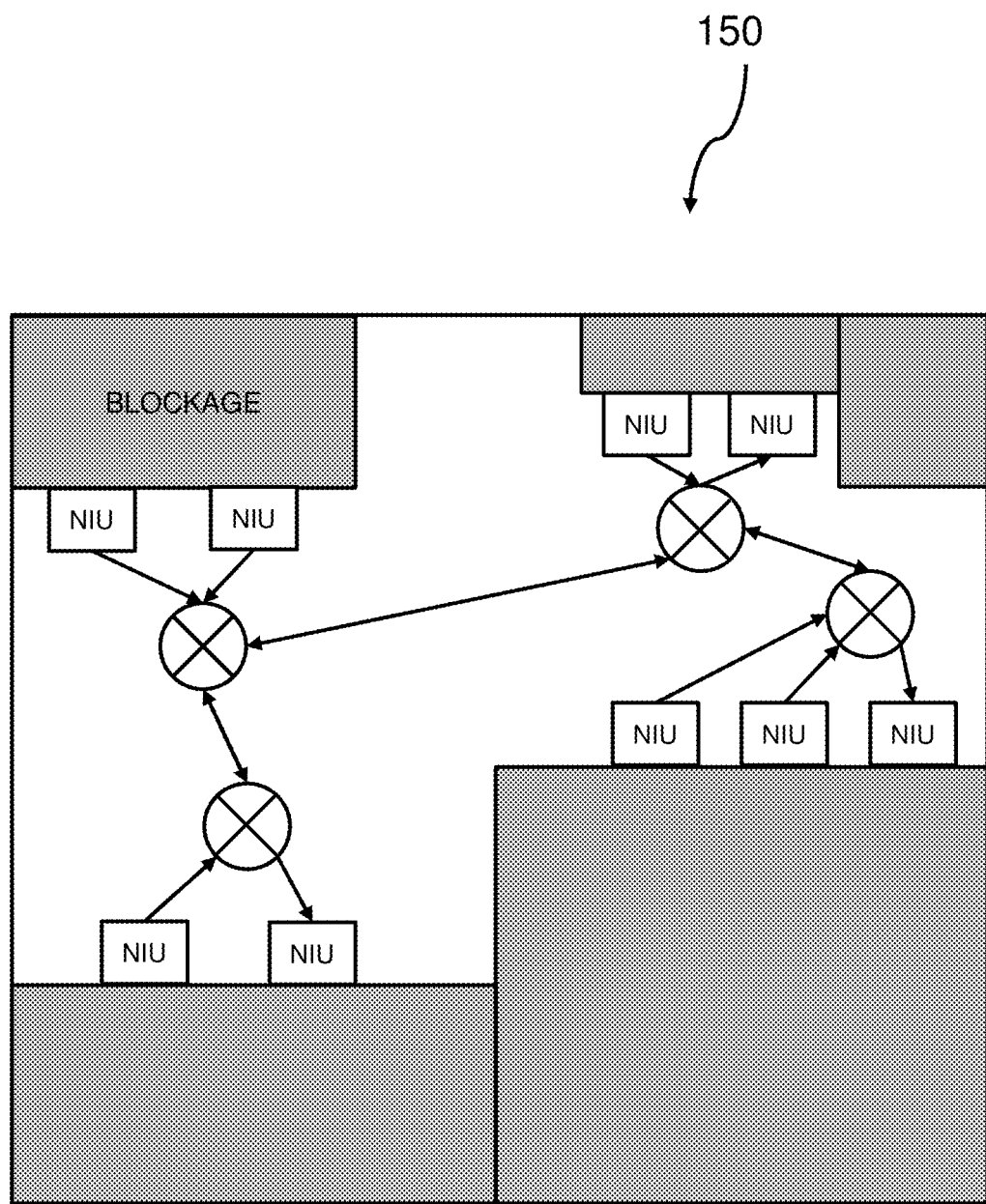
FIG. 1B shows a NoC with elements placed on a floorplan of a network.

Referring now to FIG. 1B, a NoC 150 is shown with various elements, such as NIUs, switches, and blockage areas in the floorplan. The NoC 150 includes various connectivity elements through various switches. In accordance with one aspect of the invention, a set of constraints are used as input to the tool, which is discussed in greater detail below. In accordance with some aspects of the invention, the tool executes a set of sub-steps and produces the description (synthesis) of a resulting NoC, such as the NoC 150, with its configured elements and the position of each element on the floorplan. The generated description is used to actually implement the NoC hardware, using the physical information produced to provide guidance to the back-end implementation flow.

Figure 2A:
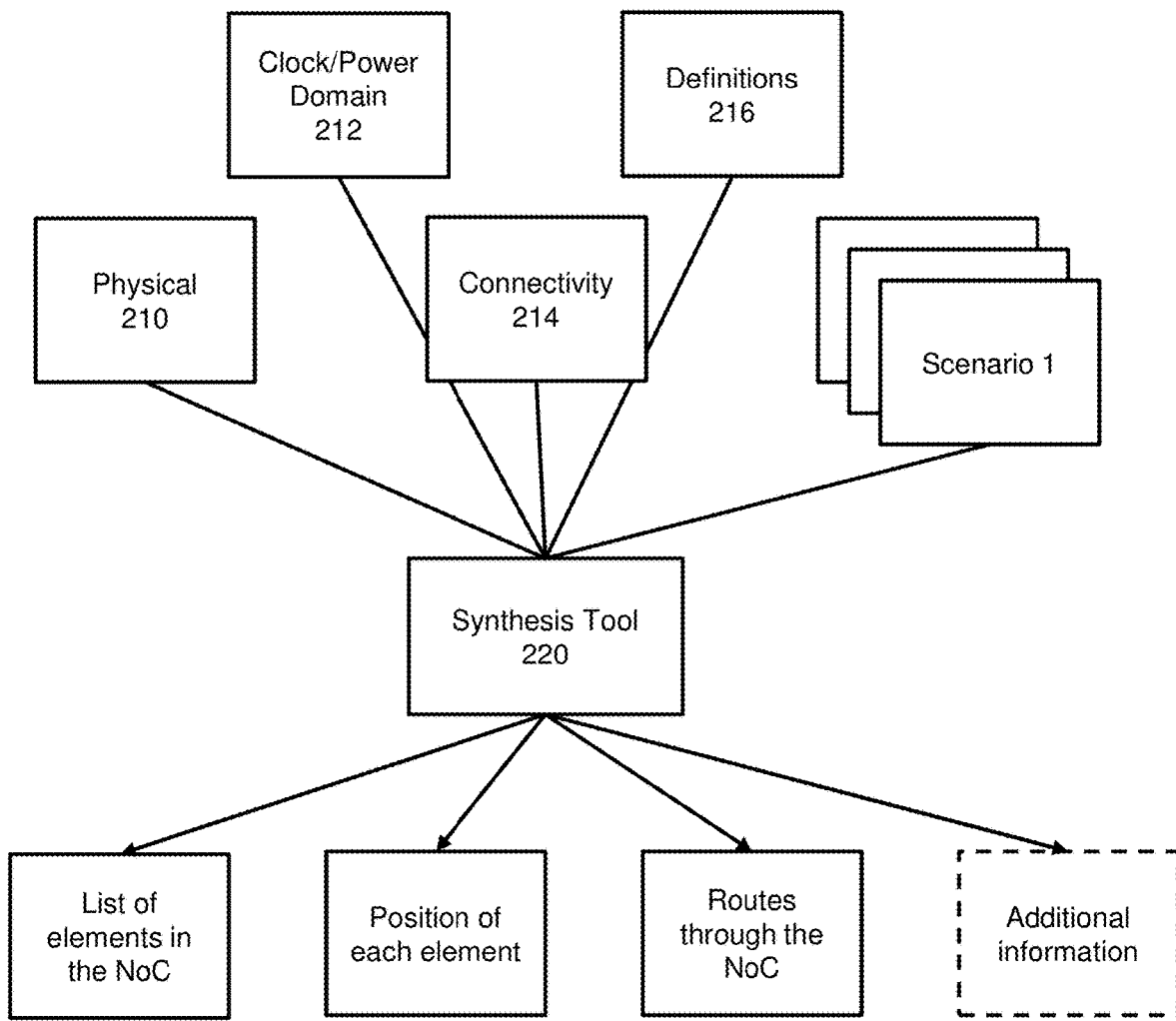
FIG. 2A shows a method for generating a NoC description based on a set of constraints in accordance with various aspects and embodiments of the invention.

Referring now to FIG. 2A, in accordance with some aspects of the invention, a set of constraints (210, 212, 214, 216, and Scenarios) are provided to a synthesis tool 220. In accordance with some embodiments and aspects of the invention, the performance and function of the tool 220 may include third-party ASIC implementation tools such as logic synthesis, place and route back end tools, and so on. A designer or user builds the set of constraints that are provide to the tool 220. The constraints are captured in machine-readable form, such as computer files using a defined format to capture information, that is understood and processed by the tool. In accordance with one aspect of the invention the format is XML. In accordance with another aspect of the invention the format is JSON. The scope of the invention is not limited by the specific format used.

Figure 2B:
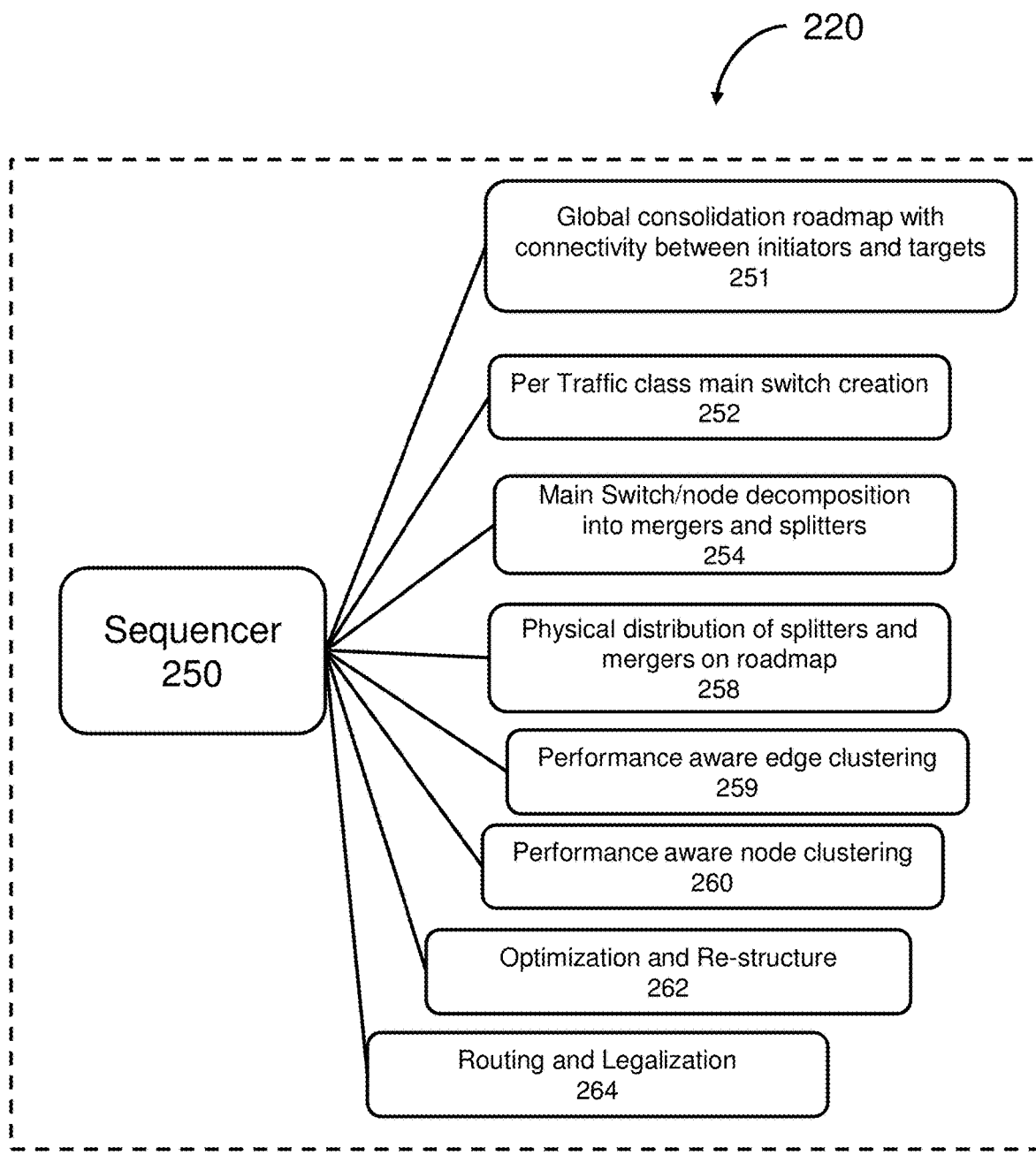
FIG. 2B shows a block diagram of a NoC synthesis tool in accordance with various aspects and embodiments of the invention.

Referring now to FIG. 2B, the tool reads the files containing the description of the constraints and executes the synthesis process. In accordance with some aspects of the invention, the synthesis process is broken down into multiple steps. A sequencer 250 is responsible for executing each step of the process. In accordance with some aspects of the invention, a set of steps are executed by the sequencer 250 of the tool 220 in light of the constraints set forth by the user/designer. The scope of the invention is not limited by the number and kind of steps the sequencer 250 may call and execute.

Referring again to FIG. 2A along with FIG. 2B, in accordance with the various aspects of the invention, the designer of the network provided and defines a set of constraints, such as constraints 210, 212, 214, and 216. A sequencer 250 receives various inputs, including: input 251 that includes global consolidation roadmaps with connectivity between initiators and targets including roadmap creation and information between each master and slave; input 252 that includes traffic classification and main switch creation; input 254 that includes main switch decomposition into mergers and splitters; input 258 that includes information about physical distribution of splitters and mergers in the roadmap; input 259 that includes information about edge clustering; and input 260 that includes information about performance aware node clustering. In accordance with one aspect of the invention, the sequencer 250 also receives input 262 that includes information about optimization and network restructuring. In accordance with one aspect of the invention, the sequencer 250 receives 264 that includes information about routing and legalization. In accordance with various aspects and embodiments of the invention, the sequencer 250 uses all the inputs 251-264 to generate the network. In accordance with various aspects and embodiments of the invention, the sequencer 250 uses a combination of the inputs 251-264 to generate the network.

In accordance with the various aspects of the invention, input 251 includes input about the global consolidation roadmap. The global consolidation roadmap includes a consolidation model that captures the global physical view of the connectivity of the floorplan's free space, as well as the connectivity across/between the initiators and targets. The global consolidation roadmap is modeled by a graph of physical nodes and canonical segments that are used to position the nodes. (splitters, mergers, switches, adapters) of the network under construction. The global consolidation roadmap is used to fasten computation. In accordance with various aspects of the invention, the global consolidation roadmap is persistent, which means that it is data the system exports and re-consumes in incremental synthesis and subsequent runs.

In accordance some aspects of the invention, input 259 incudes information about edge clustering. Edge clustering aims to minimize resources and enhancing performance goals through proper algorithms and techniques. In accordance with some aspects of the invention, edge clustering is applied in conjunction and in cooperation with input 260, node clustering. Edge clustering and node clustering can be used in combination by mixing, by being applied concurrently, or by being applied in sequence. The advantage and goal is to expand the spectrum of synthesis and span a larger solution space for the network.

In accordance with various aspects of the invention, input 262 includes information about re-structuring. Re-structuring includes a variety of transformations and capabilities. In accordance with some aspects of the invention, the transformations are logical in that there is a change in structure of the network. In accordance with some aspects of the invention, the transformation are physical because there is a physical change in the network, such as moving a node to a new location. Other examples of re-structing include: breaking a node into smaller nodes; reparenting between nodes; network sub-part duplication to avoid deadlocks and to deal with congestion; and physically re-routing links to avoid congestion areas or to meet timing constraints.

Figure 3:
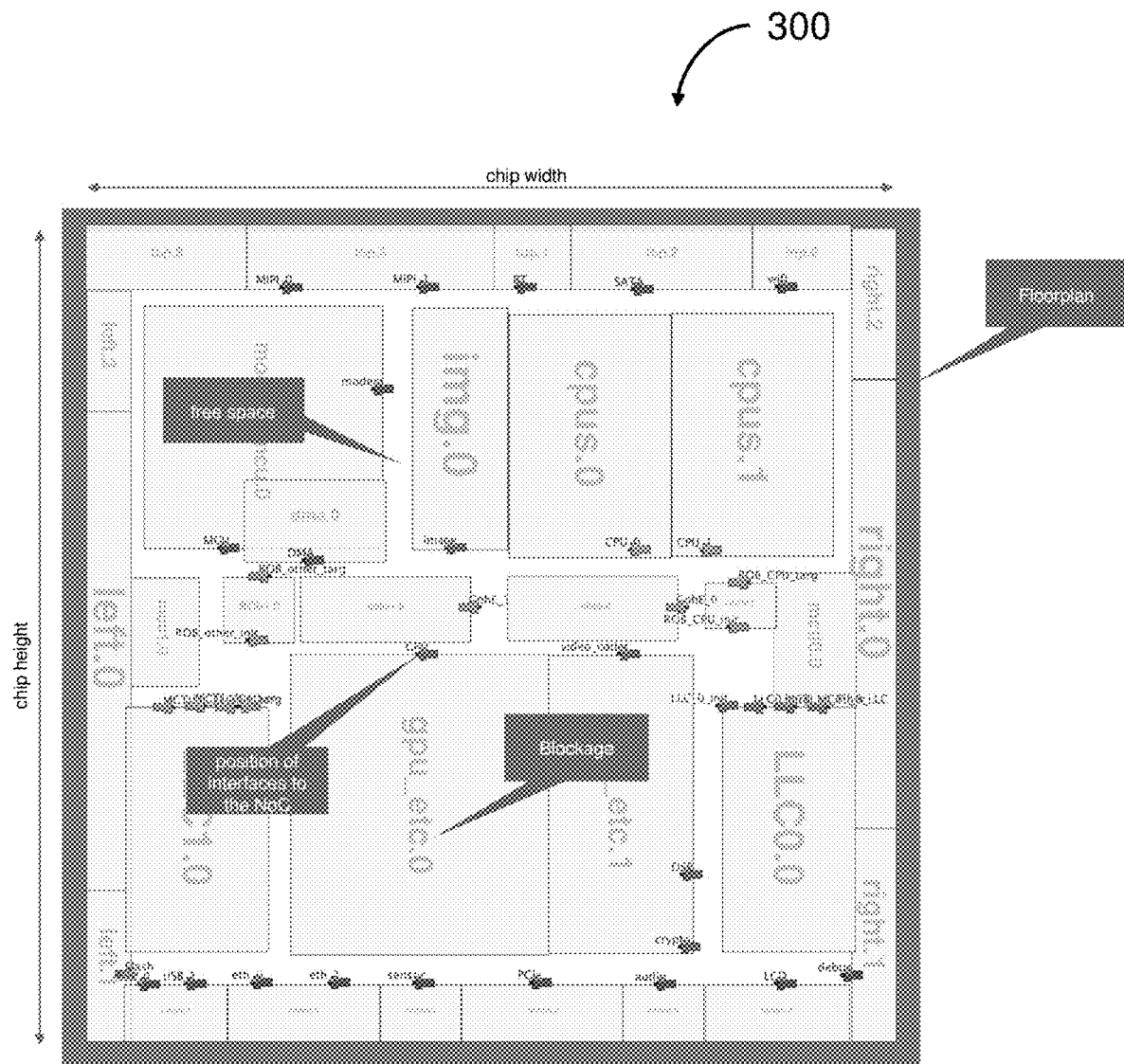
FIG. 3 shows a graphical view of the floorplan of a chip with blockage areas and positions of interface to the NoC in accordance with various aspects and embodiments of the invention.

Referring now to FIG. 3, in accordance with the various aspects of the invention, a floorplan 300 of the chip onto which the NoC is implemented is shown, with positions for various initiator interfaces and target interfaces. The physical constraint 210 provides physical information about the design that includes: the size of the chip onto which the NoC will be implemented; the various blockages areas on the floorplan, which are rectangles representing area of the chip onto which the NoC logic cannot exist or be placed; the free space, which is area of the chip where the NoC logic can exist and is defined by area not covered by a blockage; and the position of the interfaces between the SoC units and the NoC, which is the position of the initiator interfaces and the targets interfaces, such as NIUs.

In accordance with the various aspects of the invention, another constraint includes extension of the clock domain and power domain 212 can also be provided. The domain 212 includes areas of the chip where logic belonging to a particular domain is allowed to be placed.

In accordance with the various aspects of the invention, capabilities of the logic library, which will be used to implement the NoC, are provided. The information includes the size of a reference logic gate, and the time it takes for a signal to cover a 1 mm distance.

Referring again to FIG. 2A, in accordance with the various aspects of the invention, a SoC includes multiple clocks domains and multiple power domains. A clock domain is defined by all the logic fed by a given clock input. The clock input is characterized by the frequency of the clock, which is its most important parameters. A power domain is defined by all the logic getting power supply from the same power source. In accordance with the various aspects of the invention, the power source is gated, thus, the power domain can be on or off or isolated from other power domains. As such, the designer provides the set of clock domain and power domain constraints 212 as part of the initial design.

In accordance with the various aspects of the invention, initiators and targets are communicatively connected to the NoC. An initiator is a unit that send requests, typically read and write commands. A target is a unit that serves or responds to requests, typically read and writes commands. Each initiator is attached to or connected to the NoC through a NIU. The NIU that is attached to an initiator is called an Initiator Network Interface Unit (INIU). Further, each target is attached to the NoC through an NIU. The NIU that is attached to a target is called a Target Network Interface Unit (TNIU). The primary functionality of the NoC is to carry each request from an initiator to the desired destination target, and if the request demands or needs a response, then the NoC carries each target's response to the corresponding requesting initiator. Initiators and targets have many different parameters that characterize them. In accordance with the various aspects of the invention, for each initiator and target, the clock domain and power domain they belong to are defined. The width of the data bus they use to send write and receive reads payloads is a number of bits. In accordance with the various aspects of the invention, the width of the data bus for the connection (the communication path to/from a target) used to send write requests and receive write responses are also defined. Furthermore, the clock and power domain definition are a reference to the previously described clock and power domains existing in the SoC, as described herein.

Figure 4:
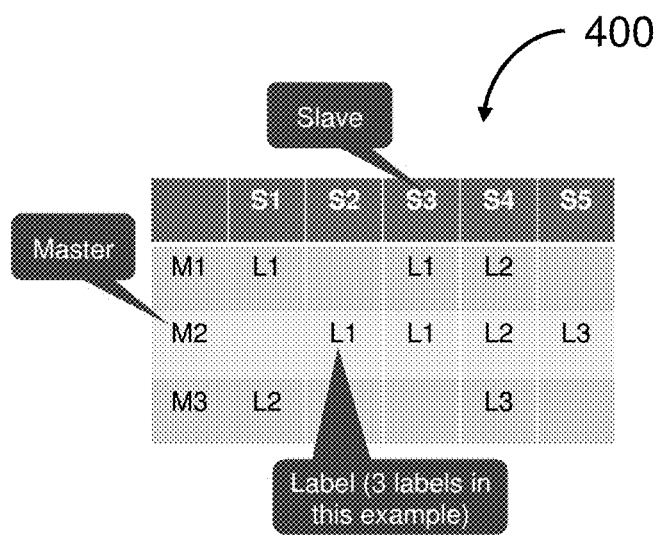
FIG. 4 shows a connectivity table of a NoC in accordance with the various aspects and embodiments of the invention.

Continuing with FIG. 2A and FIG. 2B and referring also to FIG. 4, a connectivity table 400 is shown. In accordance with the various aspects of the invention, the table 400 allows for traffic to be defined by classification. The tool permits using a traffic class label for each connection between an initiator and a target. As shown in table 400, there are three traffic classes: L1, L2, and L3. A traffic class label is an arbitrary label, chosen by the user or designer. Any number of labels can be defined and the scope of the invention is not limited by the number of labels. Each label represents the need for independent network resources. Each label will be given a distinct sub-network by the invention, which can be physically different, or use virtual networks, if supported by the underlying NoC technology.

In accordance with the various aspects of the invention, initiators are not required to be able to send requests to all targets or slaves that are connected to the NoC. The precise definition of the target that can receive requests from an initiator is outline or set forth in the connectivity table, such as table 400. The connectivity and traffic class labelling information can be represented as a matrix. Each master has a row and each slave has a column. If a master must be able to send traffic to a slave, a traffic class label must be present at the intersection between the master row and the slave column. If no label is present at an intersection, then the tool does not need connectivity between that master and that slave. For example, master 1 (M1) is connectively communicating with slave 1 (S1) using a defined label 1 (L1) while M1 does not communicate with S2 and hence there is no label in the intersection of M1 and S2. In accordance with the various aspects of the invention, the actual format used to represent connectivity can be different, as long as each pair of master-slave combination has a precise definition of its traffic class, or no classification label if there is no connection.

Figure 5:
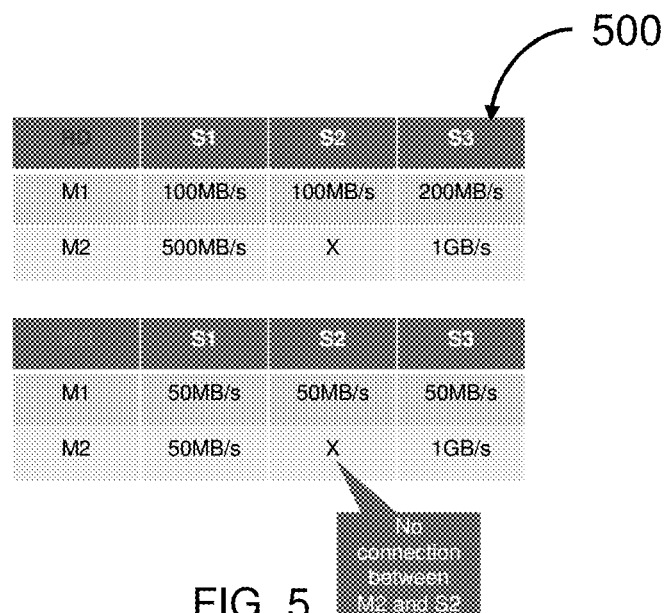
FIG. 5 shows a scenario table with throughput definitions for read and write transactions in accordance with the various aspects and embodiments of the invention.

Referring now to FIG. 5, a table 500 is shown in accordance with the various aspects of the invention, that includes various scenarios (shown in FIG. 2A) for read (RD) and write (WR) transaction. The table 500 includes information that define the various throughput rates provided to the tool.

A scenario defines the expected performance in term of throughput of data between a master and a slave. Each scenario describes the expected required read bandwidth and the expected required write bandwidth between each initiator and each target. Throughput is defined in bytes-per-second (B/s). A typical SoC will have multiple mode of operations. As an example, a SoC for a smartphone might have a gaming mode of operation, an audio call mode of operation, an idle mode of operation and so on. These define scenarios that depend on different throughput rates. Thus, a set of scenarios represents the different mode of operation the SoC supports and, correspondingly, the expected NoC minimum performance in terms of throughput between masters and slaves.

A scenario can be represented as 2 matrices, one defining read throughputs and one defining write throughputs. In accordance with the various aspects of the invention, read throughput requirements will be used to size the response network, which handles data returning from slaves back to master. Write throughput requirements will be used to size the request network, which is data going from master to slave, in accordance with the various aspects of the invention. An example, in accordance with the various aspects of the invention, of the throughput requirements for the various scenarios is shown in table 500. The actual format used to represent a scenario can be different, as long as each pair of (master, slave) has a precise definition of its minimum required throughput for read and for write. In table 500, read transaction from M1 to S1 has a minimum performance throughput of 100 MB/s. In table 500, a write transaction from M1 to S1 has a minimum throughput of 50 MB/s.

In accordance with some aspects of the invention, scenarios are not defined for the tool, in which case the tool optimizes the NoC synthesis process for physical cost, such as lowest gate cost and/or lowest wire cost.

Figure 6:
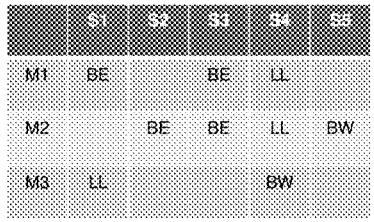
FIG. 6 shows creation of a network with 3 traffic classes in accordance with the various aspects and embodiments of the invention.
Figure 6:
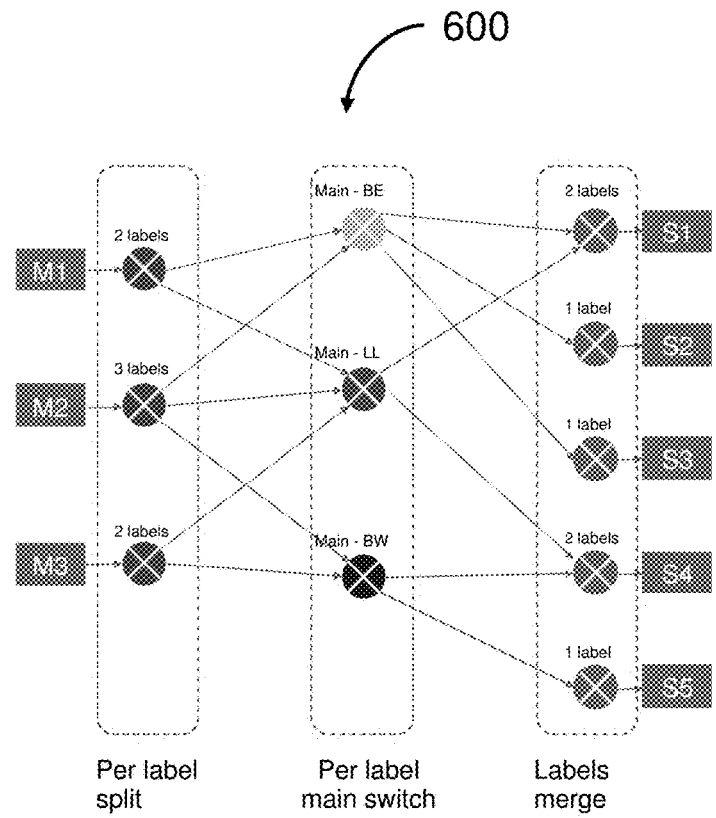

Referring now to FIG. 6 along with FIG. 2B, an initial network 600 is created in accordance with the various aspects of the invention. The network 600 implements the connectivity matrix with the following defined parameter or components:
- one network interface unit per master,
- one network interface unit per slave,
- one switch is created per defined traffic class, called the main switch of the class,
- one switch after each initiator/master NIU that split traffic to the different main switches that this master needs to reach,
- one switch before each target/slave NIU that merges traffic from the different main switches that are sending traffic to that target In accordance with various embodiments and aspects of the invention, there are three (3) traffic classes. In accordance with embodiment: traffic class #1 is Best Effort (BE), traffic class #2 is Low Latency (LL), and traffic class #2 is Bandwidth Controlled (BW). The data width of each switch, and the clock domain it belongs to, is computed using the data width of each attached interface, and their clock domain, as inputs to the tool. In accordance with the various aspects of the invention, each step that transforms the network, which is part of the NoC, also perform the computation of the data width and the clock domain of the newly created network elements.

Figure 7:
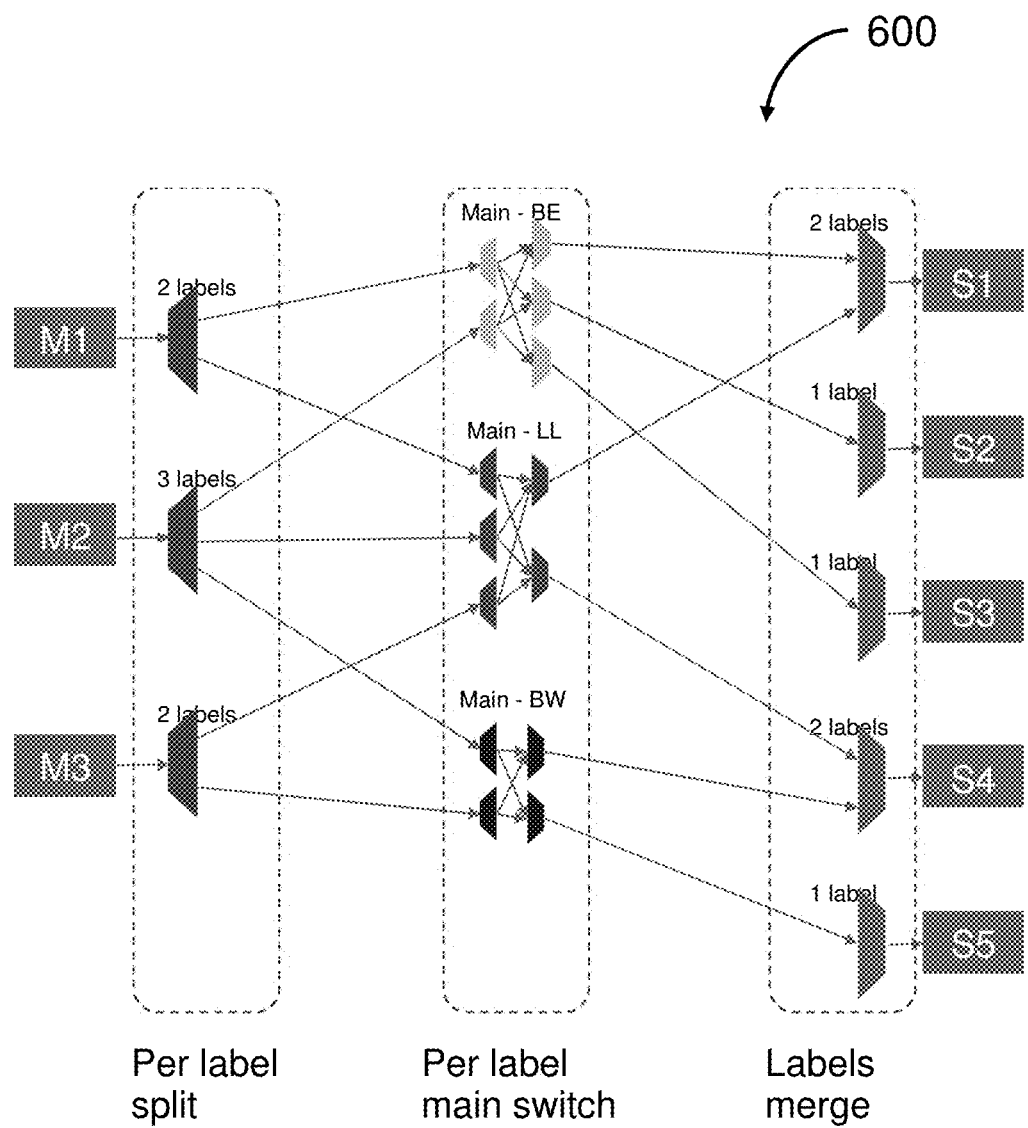
FIG. 7 shows decomposition of the network of FIG. 6 with mergers and splitters in accordance with the various aspects and embodiments of the invention.

Referring now to FIG. 7 and FIG. 2B, the network 600 of FIG. 6 is shown wherein the tool's process transforms of the network 600 in accordance with the various aspects of the invention. The sequencer 250 has an input 254 representing the main switch decomposition into mergers and splitters. The tool decomposes each main switch of the network 600 into its equivalent implementation with splitters and mergers. In accordance with the various aspects of the invention, some switches have a single ingress port and multiple egress ports. In accordance with the various aspects of the invention, some switches that have multiple ingress ports and a single egress port. Each main switch ingress port is connected to a splitter, each main switch egress ports is connected to a merger. For a main switch, splitters and mergers are connected together according to the connectivity table.

Figure 8:
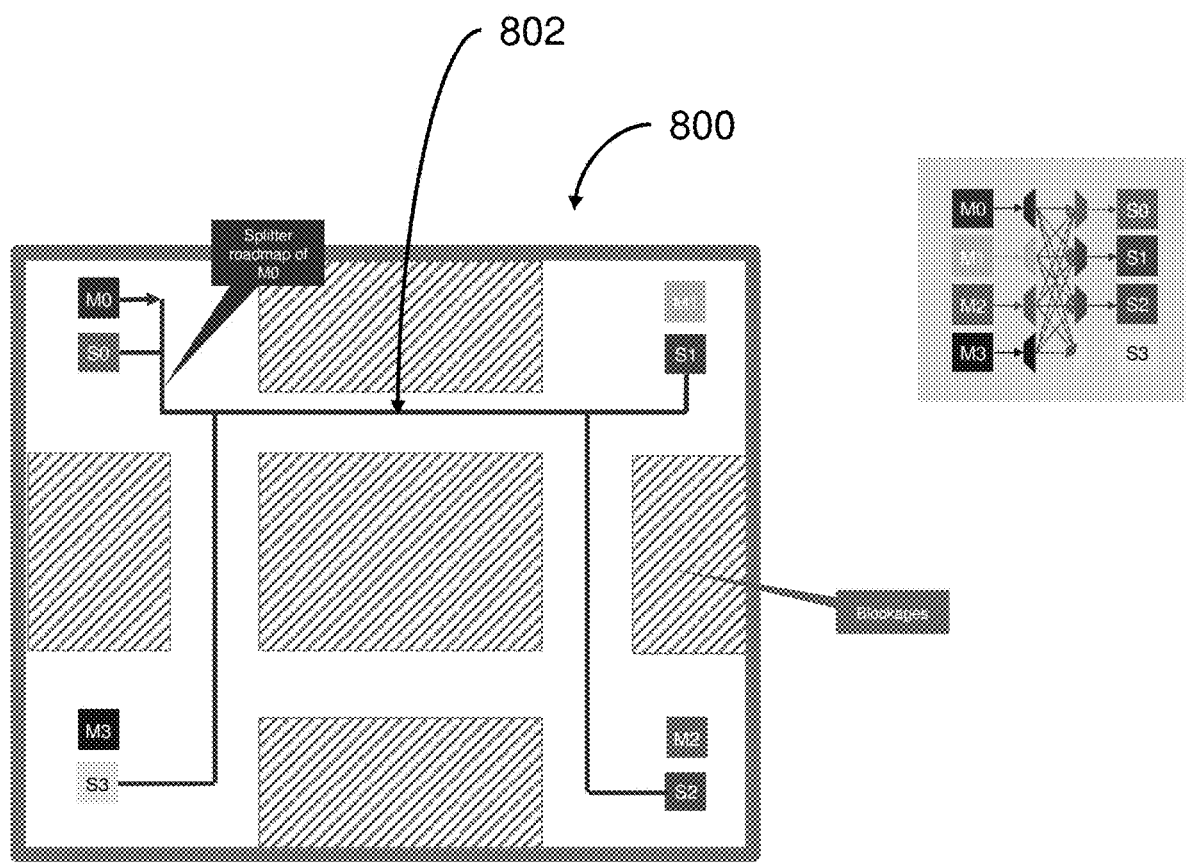
FIG. 8 shows a roadmap in a floorplan for one master of the network of FIG. 6 in accordance with the various aspects and embodiments of the invention.

Referring now to FIG. 8, a floorplan 800 is shown in accordance with the various aspects of the invention. The sequencer 250 has an input 256 representing a roadmap creation between each master and slave. The floorplan 800 includes a physical path 802 that is computed between a master interface (M0) on the floorplan, and each of its connected slaves, such as slave S0, slave S1, slave S2, and slave S3. The path 802 is called the splitter roadmap of the master M0; while not shown, every master will have a splitter roadmap. The tool uses any algorithm suitable to finding a path between a source point and multiple destination points, including algorithms that minimizes the length of the paths.

Figure 9:
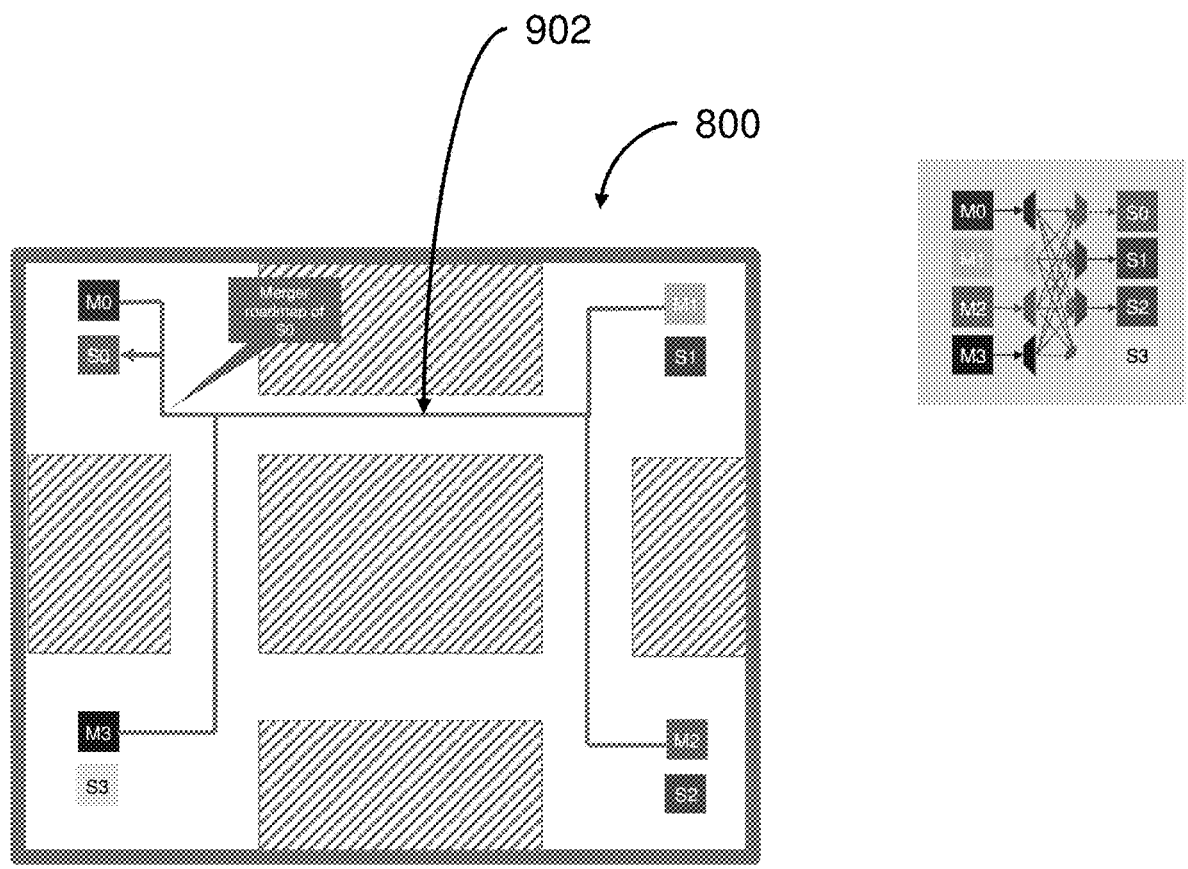
FIG. 9 shows a roadmap in a floorplan for one slave of the network of FIG. 6 in accordance with the various aspects and embodiments of the invention.

Referring now to FIG. 9, the floorplan 800 with a computed a physical path 902 between a slave interface for the slave S0 on the floorplan and each of its connected masters. The path 902 is a merger roadmap of the slave S0. As will be apparent, every slave will have a merger roadmap. The tool uses any algorithm suitable to finding a path between multiple sources point and a destination point can be used, including algorithms that minimizes the length of the paths. In accordance with the various aspects of the invention, the tool transforms the network in a way that maintains its functionality and adds location information to the network elements.

Figure 10:
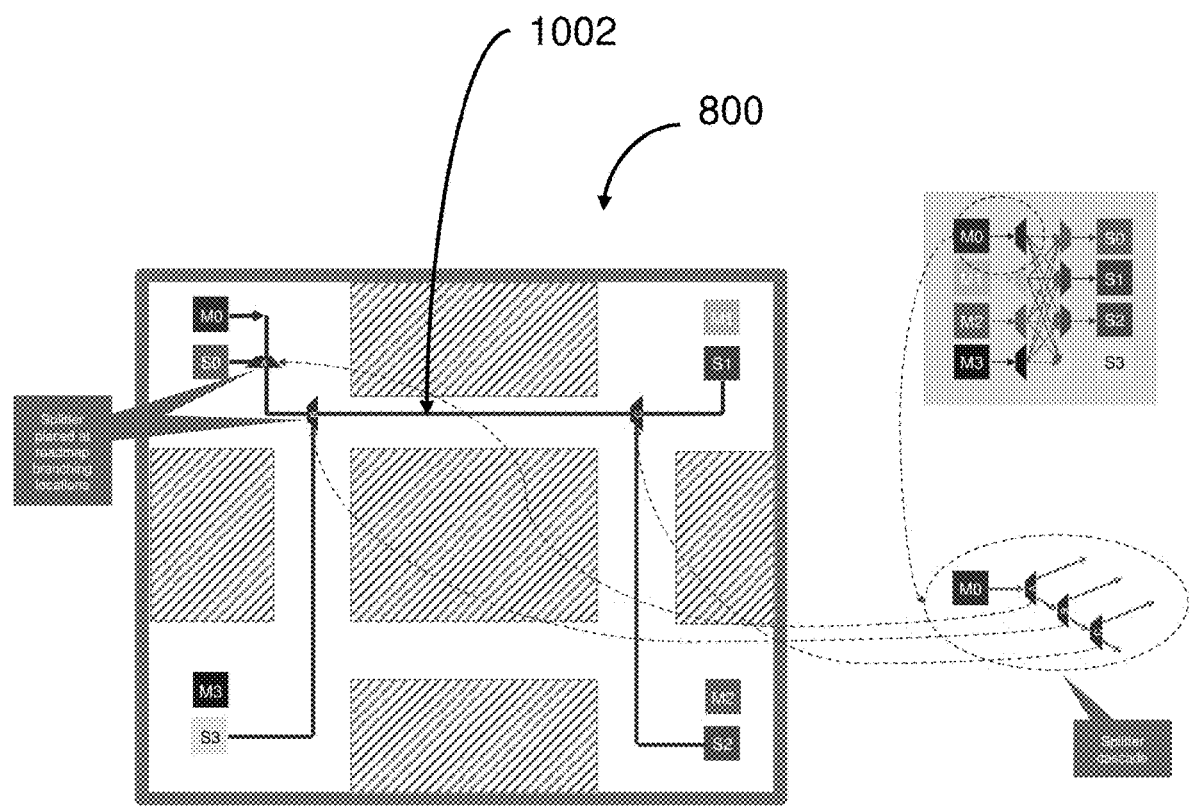
FIG. 10 shows decomposition of a main node splitter into a cascade of splitters distributed physically along the roadmap of FIG. 8 in accordance with the various aspects and embodiments of the invention.

Referring now to FIG. 10, the floorplan 800 is shown with a path 1002 in accordance with the various aspects of the invention. The sequencer 250 has an input 258 the provides physical distribution of splitters and mergers on the roadmap. Using the tool, each switch is decomposed into mergers and splitters. Using the tool, each splitter in the main switch is decomposed further into a cascade of splitters and each splitter of the cascade being placed on a branching point of the splitter roadmap of the attached master. The branching point of the roadmap is defined by the fact that the path is being split into two or more branches.

Figure 11:
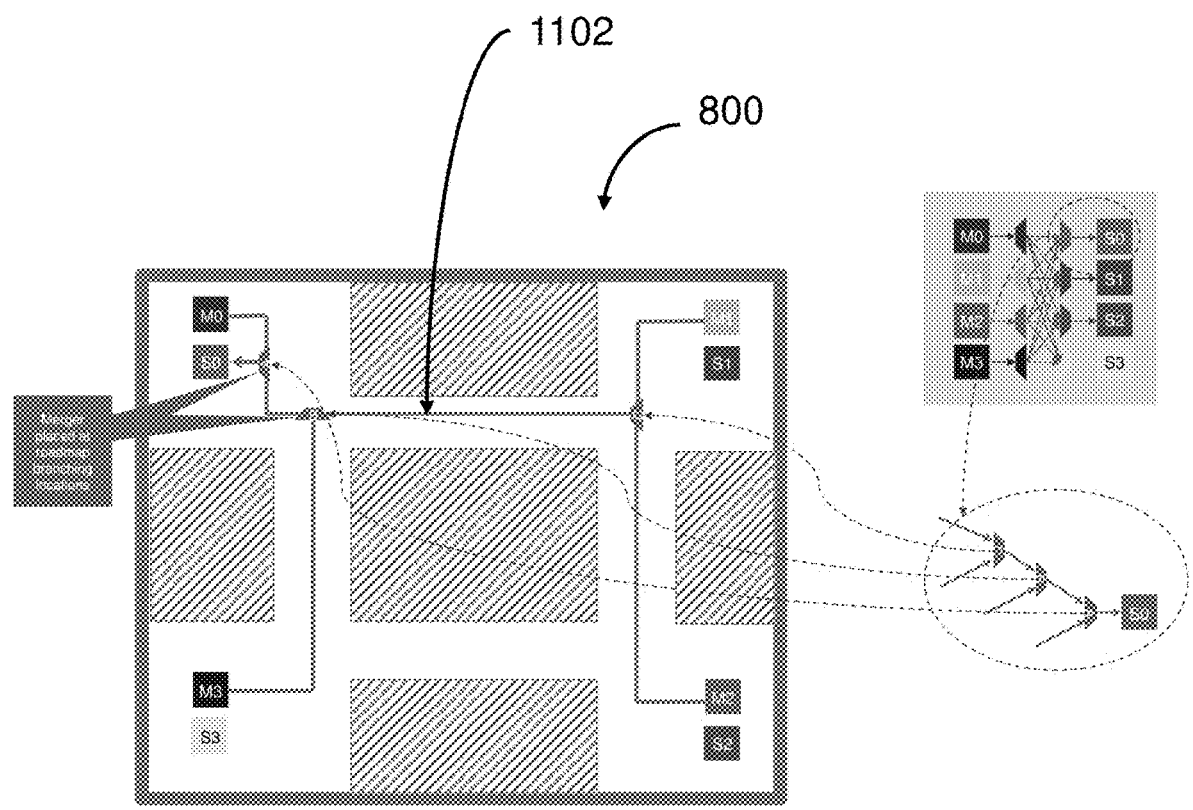
FIG. 11 shows decomposition of a main node merger into a cascade of mergers distributed physically along the roadmap of FIG. 9 in accordance with the various aspects and embodiments of the invention.

Referring now to FIG. 11, the floorplan 800 is shown with a path 1102 in accordance with the various aspects of the invention. Using the tool, each switch for each of the mergers in the main switch, the merger is decomposed further into a cascade of mergers, each merger of the cascade being placed on a branching point of the merger roadmap of the attached slave. The branching point of the roadmap is defined by the fact that the path is being split into two or more branches. The process of decomposing a splitter in a cascade of splitters preserves the original splitter functionality, as the number of inputs to the cascade is still one, and the number of outputs of the cascade is identical to the number of outputs of the original splitter. The process of decomposing a merger in a cascade of mergers preserves the original merger functionality, as the number of outputs of the cascade is still one, and the number of inputs to the cascade is identical to the number of inputs to the original merger. In accordance with the various aspects of the invention, the effect of the process is to obtain a set of elementary switches, which are represented by the mergers and the splitters, that are physically placed close to where the actual connections between switches need to be.

In accordance with the various aspects of the invention, the tool transforms the network in order to reduce the number of wires used between switches achievable, while keeping the performances as defined in the scenarios, which are a set of required minimum throughput between master and slave. In accordance with the various aspects of the invention switches are clustered for performance aware switching, mergers and splitters that have been distributed on the roadmaps are treated like ordinary switches.

In accordance with an aspect of the invention, the tool uses a process that is iterative and will merge switches under the condition that performances are still met, until no further switch merge can occur. The tool uses a process that is described as follows:
1) while no more switch fusion is possible, do the following:
   a) Select a candidate switch for fusion with one of its neighbors. The selection process ensures all switches in the network are eventually candidates.
   b) When a candidate is selected, search for a neighbor to fusion with. The neighboring criteria is based on evaluation of a cost function. The cost function shall return a switch that is "best suited" to fusion with the candidate. The definition of "best suited" is implementation dependent, but the cost functions shall be such that the potential fusion of the two switches maximizes the gain in term of at least one metric including: wire length; logic area; power; and performances, etc.
   c) Test if, in case the fusion happens, that the performance scenarios will still all meet the minimum throughput requirements. If not, then these two switches cannot be merged. The process executed by the tool searches for another neighbor until either no more neighbors can be found, in which case all switches are left intact, or one neighbor is found that can be merged with the candidate without violating the minimum throughput requirements of all scenarios, in which case the network is modified by merging the candidate switch with the neighbor.

In accordance with various aspects of the invention, it is possible for the process to ensure the switches do not grow above a certain size (maximum number of ingress ports, maximum number of egress ports). If a combined switch is above the set threshold, then the merge is prevented.

Figure 12:
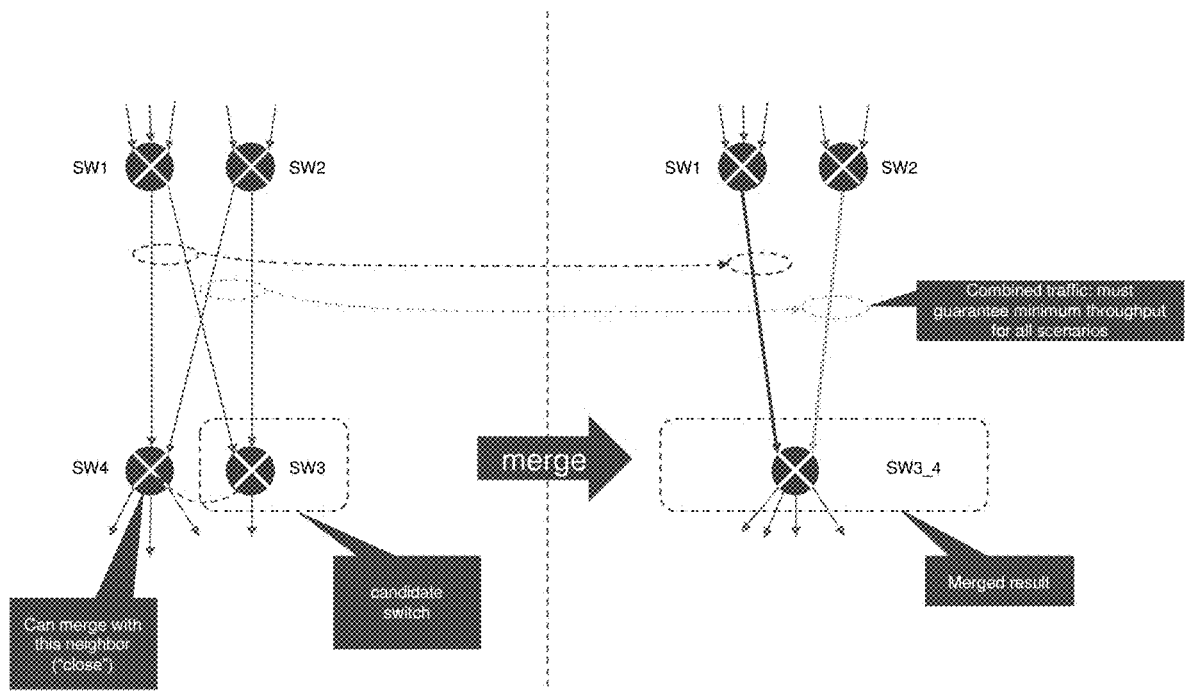
FIG. 12 shows an example of two nodes that are close and merged in accordance with the various aspects and embodiments of the invention.

Referring now the FIG. 12, candidate switch SW3 is shown next to switch SW4 for the merger, in accordance with the various aspects of the invention. The sequencer 250 has an input 260 that provides performance aware switching clustering. The tool executes a process for merging two switches. When the switches are merged, the wires that were going from different switches, are simplified into one wire from each connected switch to the combined switch. In accordance with the various aspects of the invention, switches SW3 and SW4 are merged. The connections between SW1 and SW4 and SW3, are combined and replaced by a single connection between SW1 and SW3_4. Thus, long connections between distant switches are removed and reduced to a minimum, while connections between close switches are removed and done inside the switch themselves.

Referring again to FIG. 2B, an input 262 to the sequencer 250 includes various optimizations can be performed to further reduce the number of wires used by the network, the area of the network elements, and the power consumed by network elements. Examples of such optimization include: detection of links that can be removed because they are not used, or their traffic can be re-routed; reducing the width of a link if the link is wider than required by the scenarios; and performing wire length optimization through finding an optimal placement of all the switch elements that minimizes the total wire length of the network, wherein the total wire length of the network is the sum of the distance spanned by each connection between network elements times the width of that connection.

Continuing with FIG. 2B, an input 264 to the sequencer 250 includes producing a legal NoC by modifying the location of the network elements so that the network elements fit in the allocated free space and do not overlap, and they exist in the corresponding clock and power domain limits. In accordance with various aspects of the invention, the area occupied on the die by each network element is computed using the information provided regarding the capabilities of the technology, such as the area of a reference logic gate. Then each element is tested for correctness of its placement (enough free space exists for the element, no other element overlaps). If the test fails, the element is moved until a suitable location is found where the test passes.

In accordance with other aspects of the invention, extension of clock and power domains on the floorplan are provided and each element is tested to ensure it is located within the bounds of the specified clock and power domain. If the test fails, the element is moved until a suitable location is found where the test is passing. Once a suitable placement has been found for each element, a routing is done of each connection between element. The routing process will find a suitable path for the set of wires making the connections between elements. After routing is done, distance-spanning pipeline elements are inserted on the links if required, using the information provided regarding the capabilities of the technology, based on how long it takes for a signal to cover a 1 mm distance.

In accordance with some aspects and embodiments of the invention, the tool generates one or more computer files describing the generated NoC that includes:
   The list of network elements with their configuration: data width, clock domain.
   The position of each generated network element on the floorplan.
   The set of routes through the network elements implementing the connectivity. In accordance with the aspects of the invention, a route is an ordered list of network elements, one for each pair of (initiator, target) and one for each pair of (target, initiator). The route represents how traffic between the pairs will flow and through which elements.

In accordance with various aspects of the invention, the tool is used to generate metrics about the generated NoC, such as: histograms of wire length distribution, number of switches, histogram of switch by size.

In accordance with another aspect of the invention, the tool automatically inserts in the network various adapters and buffers. The tool inserts the adapters based on the adaptation required between two elements that have different data width, different clock and power domains. The tool inserts the buffers based on the scenarios and the detected rate mismatch.

In accordance with some aspects and embodiments, the tool can be used to ensure multiple iterations of the synthesis are done for incremental optimization of the NoC, which includes a situation when one constraint provided to the tool is information about the previous run.

After execution of the synthesis process by the software, the results are produced in a machine-readable form, such as computer files using a well-defined format to capture information. An example of such a format is XML, another example of such a format is JSON. The scope of the invention is not limited by the specific format.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A method comprising:
   receiving a plurality of constraints for a network-on-chip (NoC);
   generating a network description for the NoC using the plurality of constraints, wherein the network description handles a plurality of traffic classes and satisfies the plurality of constraints;
   generating a global consolidation roadmap including nodes and edges between a plurality of initiators and a plurality of targets;
   merging at least two nodes using performance-aware node clustering;
   clustering edges using performance aware edge clustering; and
   generating a synthesis of the NoC.

2. The method of claim 1, wherein the plurality of constraints includes:
   a plurality of performance constraints for the NoC; and
   a plurality of physical constraints for the NoC.

3. The method of claim 1, wherein the network description includes traffic classification for connectivity between the plurality of initiators and the plurality of targets.

4. The method of claim 1 further comprising creating a main node for each of the plurality of traffic classes.

5. The method of claim 4 further comprising:
   decomposing the main node into mergers and splitters;
   decomposing the mergers into a plurality of merger cascades; and
   decomposing the splitters into a plurality of splitter cascades.

6. The method of claim 1 further comprising:
   physically distributing a first group of splitter cascades selected from a plurality of splitter cascaded and a first group of merger cascades selected from a plurality of merger cascaded on the global consolidation roadmap; and
   physically distributing a second group of splitter cascades selected from the plurality of splitter cascaded and a second group of merger cascades selected from the plurality of merger cascaded on the global consolidation roadmap.

7. The method of claim 1 further comprising providing a plurality of definitions, wherein the plurality of definitions includes clock and power domain definitions.

8. The method of claim 7 wherein the plurality of definitions includes initiator and target connectivity.

9. The method of claim 8, wherein each connectivity definition is labelled by traffic class.

10. The method of claim 7 wherein the plurality of definitions includes a set of scenarios.

11. The method of claim 1 further comprising:
optimizing the network description; and
re-structuring the network description.

12. The method of claim 1 further comprising performing routing and legalization of the network description.

13. The method of claim 1, wherein the global consolidation roadmap includes:
a first roadmap between the plurality of initiators and the plurality of targets for each target receiving communication from its respective initiator; and
a second roadmap between the plurality of targets and the plurality of initiators for each initiator receiving communication from its respective target.

14. The method of claim 1 further comprising:
generating a list of network elements for the NoC including configuration for each network element;
positioning of each network element on a floorplan of the NoC; and
locating a set of routes on the floorplan of the NoC for connectivity between the network elements, wherein each route includes nodes and edges.

15. The method of claim 14 further comprising implementing the NoC using at least one of: logic synthesis tool and place-route back end tool.

* * * * *